(No Model.)
J. C. ANDERSON.
DEVICE FOR CONVEYING CLAY AND CLAY SHALE TO THE MACHINES FOR PRESSING THEM INTO BRICKS.
No. 311,052. Patented Jan. 20, 1885.
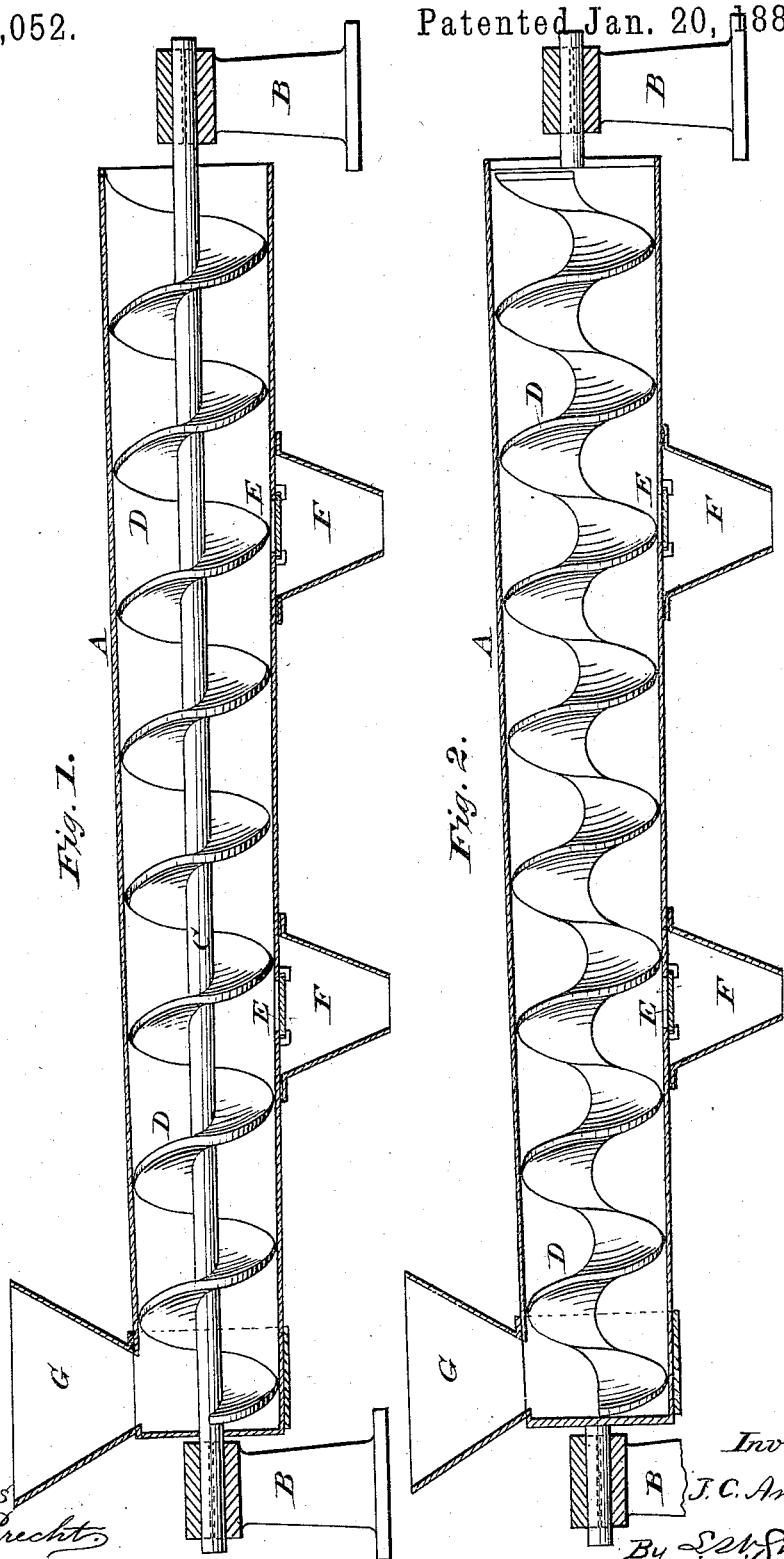
Witnesses
Inventor:
J. C. Anderson
By _____
Attorney.

UNITED STATES PATENT OFFICE.

JAMES C. ANDERSON, OF HIGHLAND PARK, ILLINOIS.

DEVICE FOR CONVEYING CLAY AND CLAY-SHALE TO THE MACHINES FOR PRESSING THEM INTO BRICKS.

SPECIFICATION forming part of Letters Patent No. 311,052, dated January 20, 1885.

Application filed October 14, 1884. (No model.)

*To all whom it may concern:*

Be it known that I, JAMES C. ANDERSON, a citizen of the United States, residing at Highland Park, in the county of Lake and State of Illinois, have invented certain new and useful Improvements in Devices for Conveying Clay, Clay-Shale, &c., of which the following is a specification, reference being had therein to the accompanying drawings.

My invention relates to improvements in devices for conveying clay and clay-shale from the disintegrator to the reducing-mills or to the machines for pressing the clay into bricks or other forms.

The object of my invention is to provide a device which will convey clay and other dry material in bulk from one point to another, and at the same time so arrange and construct the parts that the carrier or conveyer will not be subjected to rapid wear or disintegration by the sand contained in the clay; and to this end my invention consists in securing a screw or spiral or spirals within a cylinder and adapting the screw to revolve with the cylinder, so that the material placed in one end of the cylinder will follow the spirals by the action of gravitation induced by the revolution of the cylinder, and in this manner be conveyed from one end of the cylinder to the other or to points of egress in the sides of the cylinder, as will more fully appear.

Referring to the drawings, Figure 1 is a longitudinal sectional view of a screw having a central shaft located within a cylinder. Fig. 2 is a similar view in which a spiral is used without a central shaft.

In devices for conveying grain and other material it has been the practice to mount the screw in a trough or other suitable structure, and by the rotation of the screw the material is carried along through the trough to its destination. This form of construction answers well for grain and other material where there is no grit or sand; but for clay, clay-shale, and similar material containing more or less sand or grit the screw and shell or trough which surrounds it are rapidly worn away by the sand and grit, and the conveyer is soon worn out and rendered unfit for use.

A is a cylinder, of any suitable material, preferably of any sheet metal, and of any desired length and diameter, mounted on suitable supports, B, and adapted to be rotated in bearings in said supports B. If the cylinder is designed for conveying material a great distance, it may be supported at intervals on suitable standards in which are mounted antifriction wheels, as is well known.

C is a shaft, (see Fig. 1,) which passes centrally through the cylinder and through the ends thereof, the projecting ends of which form trunnions or axles by which the entire structure is supported in the standards B. The shaft C is provided with a spiral or screw, D, which is rigidly secured to the shaft C and to the inside of the cylinder A, so that the cylinder and screw will be revolved together. The cylinder is provided at intervals with doors or openings E, through which the clay or clay-shale can be dropped into suitable hoppers, F, from whence it is conveyed into the reducers or to the machine which presses it or gives it form.

The doors for controlling the openings E may be rendered automatic in their operation in any suitable manner, so that when there is enough clay in the hoppers they will be closed, and when it is desired to replenish or feed the clay to the hoppers the doors can be automatically opened. By this means several reducers or machines may be supplied from the cylinder A.

G is a hopper into which the clay is fed, and falls therefrom into the spirals of the screw as the cylinder is rotated. The clay, falling to the lower portion of the drum or cylinder by gravitation, is guided and directed toward the other end of the cylinder by means of the spirals of the screw.

In order to facilitate the progress of the clay through the cylinder, the cylinder is gradually enlarged from the feeding-in end to its rear or exit end, as shown.

In Fig. 2 I have shown spirals or vanes of sheet metal secured to the inside of the cylinder, instead of the screw and screw-shaft shown in Fig. 1. This I consider a modification, and is embraced within the scope of my invention, and a series of spirals may be employed, each opening out to its respective hopper or reducer.

Having thus described my invention, what I claim, and desire to secure by Letters Patent, is—

A device for conveying clay, consisting of a cylinder provided with wings or screw-shaped spirals secured therein and adapted to be rotated with the cylinder, a stationary feed-hopper, and suitable openings in the side of the cylinder to admit of the discharge of the clay, as set forth.

In testimony whereof I affix my signature in presence of two witnesses.

J. C. ANDERSON.

Witnesses:
 LILLIE E. ANDERSON,
 J. C. CUSHMAN.